UNITED STATES PATENT OFFICE.

SILAS C. LINBARGER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE.

1,356,211.     Specification of Letters Patent.     Patented Oct. 19, 1920.

No Drawing.     Application filed June 21, 1919. Serial No. 305,868.

*To all whom it may concern:*

Be it known that I, SILAS C. LINBARGER, a citizen of the United States, residing at Niagara Falls, in the county of Niagara and State of New York, have invented a new and useful Improvement in Refractory Articles, of which the following is a full, clear, and exact description.

The present invention relates particularly to an improved refractory article, and more particularly to a glazed refractory used to support white ware, china, porcelain or other ceramic products during the biscuit or glost firings.

The principal object of the present invention is to provide a refractory or saggar of the type referred to, in which ware may be burned without producing discoloration thereof.

A still further object of the present invention is to provide a glost kiln refractory composed of silicon carbid, or carborundum, and having the surface thereof protected by a coating of vitrified or impervious material to prevent discoloration of ware burned therein.

The foregoing and other objects, together with their attendant advantages, will be apparent as the invention becomes better understood by reference to the accompanying specification, it being premised that changes may be made in the ingredients used, and in the proportions employed, within the scope of the appended claims without departing from the spirit of the invention.

It has been shown that saggars and kiln refractories of the type used in the setting and supporting of ceramic wares during the firing process may be made much superior by the utilization of silicon carbid therein. Saggars or refractories employing silicon carbid are superior to the ordinary clay saggars due to the increased mechanical strength, increased heat conductivity and increased resistance to sudden temperature changes. When ceramic materials, and especially the finer wares, such as white ware, china, porcelain and the like are fired in close proximity to saggars or refractories containing silicon carbid, it has been found that there may be an objectionable blackening or discoloration of the white or light colored ware due to the decomposition of the silicon carbid employed.

Refractories containing a large percentage of silicon carbid usually produce a detrimental discoloration of the ware contained therein during the first firing. Ordinarily, this discoloration or blackening of the ware diminishes in subsequent firings, so that after a sufficient number of such firings, the blackening effect may be almost entirely eliminated.

It has been found that the intensity of the discoloration produced is dependent on several factors. Among these is the percentage of silicon carbid in the mixture, the fineness of the grain of the silicon carbid used, the temperature at which the ware is fired, and the kiln atmosphere prevailing during the firing period. The discoloration in each of the above instances increases with the percentage of silicon carbid employed, the fineness of the grain and the temperatures to which the ware and the refractories are subjected. Experiment has shown that this blackening or discoloration of the ware is due to the dissociation or oxidation of the silicon carbid crystals in the refractories.

A close study of a piece of refractory material composed of a high percentage of silicon carbid with a clay binder, which has been fired a sufficient number of times to substantially eliminate the blackening effect so pronounced in the first burn, shows that an impervious crust or glaze has been produced on the surface thereof. This glaze protects the crystals of the silicon carbid from the action of the hot gases of the kiln, or furnace atmosphere, and prevents any further decomposition of the same, and the resulting discoloration of the ware. The glaze formed is probably due to the oxidation of the silicon carbid into silicon dioxid and carbon monoxid or carbon dioxid. The silicon dioxid so formed reacts with the clay binder of the refractory forming a mixture which vitrifies or fuses into a protective glassy coating or glaze on the surface of the refractory. The glaze so formed produces a protective coating up to temperatures not exceeding 1350° C., but above such temperatures it has such a low viscosity that its protective function is destroyed, and ware burned therein discolors badly for many firings.

I have found that by increasing the viscosity and fusion point of the glaze on the surface of the refractories that the blackening effect can be entirely eliminated even though the material is fired to temperatures in excess of 1350° C. Such a glaze may be applied to the refractories by the application of well known ceramic principles and successfully overcomes the blackening effect or discoloration in the first firing of the refractories.

Most glazes contain a high alkali content. Owing to the fact that alkalis decompose silicon carbid at temperatures above 900° C., I preferably employ a glaze having as low an alkali content as possible, while still obtaining the proper fusion of the glaze.

I have found that a glaze having the composition represented below may be successfully employed to prevent discoloration of ware.—

| | |
|---|---|
| Flint | 1100 parts |
| Clay | 800 parts |
| Spar | 10 parts |
| Whiting | 10 parts |

In a glaze having the above composition it will be noted that the alkali content is very low. In the particular composition referred to, the fluxing ingredients of the glaze constitute approximately 1.04%, thereby giving a total alkali content of .0036 molecular equivalents. It will be understood that the above batch weights are merely given as an illustration, and that the same can be varied to meet the precise conditions encountered during the firing of the ware.

The glaze or coating used may be applied to the green refractory after it has been dried, as is done in the well known terra cotta process, and subsequently fired in kilns at a sufficiently high temperature to mature both the body and the glaze in one firing. This may be brought about either in a ceramic kiln, or in the structure in which the refractory shape is to be used. If desired, however, the glaze may be applied in a slip or fluid condition by any of the well known means employed in glazing ware, after it has been first fired to its maturing temperature. When this method is employed, the whole structure is then subjected to a temperature such that the glaze will be matured and will firmly adhere to the main body of the refractory.

It will be apparent that the type of glaze employed may be varied at will, it being desirable only to produce a glaze having a low alkali content and capable of resisting temperatures in excess of 1350° C. Any combination of clays, or clay substances, or a combination thereof with silica and a fluxing material may be advantageously employed. The combination and proportions of the various ingredients is such that an impervious coating is formed on the surface of the silicon carbid refractory at the maturing temperature thereof and having a sufficiently long vitrification range so that it will not flow or boil at any temperature below that at which the ware contained therein is fired. By experiment I have found that the alkali content, where practical, should not exceed 2% of the entire composition.

I claim:

1. A refractory article for use in firing ceramic ware to prevent discoloration thereof, comprising a body containing silicon carbid, and a protective coating free from silicon carbid formed thereon, substantially as described.

2. A refractory article for use in firing ceramic ware to prevent discoloration thereof, comprising a body containing silicon carbid, and a protective coating free from silicon carbid and comprising a refractory glaze, substantially as described.

3. A refractory article for use in firing ceramic ware to prevent discoloration thereof, comprising a body containing carborundum, and a protective coating free from silicon carbid applied thereto and comprising a refractory glaze having a high viscosity, substantially as described.

4. A refractory article, the body of which contains silicon carbid and having a coating free from silicon carbid and comprising a refractory glaze with a fusion point exceeding 1350° C., substantially as described.

5. A refractory article, the body of which contains silicon carbid and having a surface coating free from silicon carbid and comprising a refractory glaze, substantially as described.

6. A refractory article, the body of which contains silicon carbid and having a coating free from silicon carbid and comprising a refractory glaze containing not to exceed 2% of fluxing constituents, substantially as described.

7. A refractory article, the body of which contains silicon carbid and having a coating free from silicon carbid and comprising a glaze having refractory properties capable of preventing superficial dissociation of the silicon carbid, substantially as described.

8. A refractory article, the body of which contains silicon carbid and having a coating free from silicon carbid and comprising a refractory glaze having a low alkali content, substantially as described.

In testimony whereof, I have hereunto set my hand.

SILAS C. LINBARGER.